United States Patent
Ketcham et al.

(10) Patent No.: US 12,079,014 B2
(45) Date of Patent: Sep. 3, 2024

(54) CONTROL SYSTEM OF AN UNFINNED LIGHTER THAN AIR PLATFORM AND METHOD FOR SAME

(71) Applicant: Aerostar International, LLC, Columbia, MD (US)

(72) Inventors: Mark Stanley Ketcham, Sioux Falls, SD (US); Michael Scott Smith, Sulphur Springs, TX (US)

(73) Assignee: Aerostar International, LLC, Columbia, MD (US)

( * ) Notice: Subject to any disclaimer, the term of this patent is extended or adjusted under 35 U.S.C. 154(b) by 100 days.

(21) Appl. No.: 18/058,062

(22) Filed: Nov. 22, 2022

(65) Prior Publication Data
US 2023/0185315 A1 Jun. 15, 2023

Related U.S. Application Data

(60) Provisional application No. 63/282,579, filed on Nov. 23, 2021.

(51) Int. Cl.
G05D 1/49 (2024.01)
G05D 1/606 (2024.01)
G05D 109/20 (2024.01)

(52) U.S. Cl.
CPC .............. G05D 1/606 (2024.01); G05D 1/49 (2024.01); G05D 2109/26 (2024.01)

(58) Field of Classification Search
CPC ....... G05D 1/606; G05D 1/49; G05D 2109/26
See application file for complete search history.

Primary Examiner — Mathew Franklin Gordon
(74) Attorney, Agent, or Firm — Kim and Lahey Law Firm, LLC; Douglas W. Kim

(57) ABSTRACT

A lighter than air platform an unfinned envelope having two or more propulsion elements coupled with the unfinned envelope proximate to the center of gravity. At least one navigation sensor is configured to monitor an actual flight path of the unfinned envelope, and at least one perturbation sensor is configured to monitor one or more perturbations of the unfinned envelope. A navigation controller is configured to guide the unfinned envelope with coordinated propulsion of the two or more propulsion elements. The navigation controller includes a navigation comparator that compares the actual flight path with a specified flight path of the unfinned envelope and determine a navigation instruction. A perturbation comparator compares the navigation instruction with the monitored one or more perturbations to determine a perturbation compensation. A propulsion coordinator controls propulsion values of each of the propulsion elements based on the navigation instruction and the perturbation compensation.

21 Claims, 5 Drawing Sheets

CONTROL SYSTEM OF AN UNFINNED LIGHTER THAN AIR PLATFORM AND METHOD FOR SAME

RELATED APPLICATIONS

This is a U.S. non-provisional patent application 63/282,579 filed Nov. 23, 2021, titled CONTROL SYSTEM OF AN UNFINNED LIGHTER THAN AIR PLATFORM AND METHOD FOR SAME incorporated herein by reference.

TECHNICAL FIELD

This document pertains generally, but not by way of limitation, to control of lighter than air platforms.

BACKGROUND

Lighter than air platforms (herein after LTA platforms), such as atmospheric balloons, air ships, dirigibles, aerostats, or the like are inflated with a lift gas, such as helium, to provide positive buoyancy and elevate the platforms to one or more specified altitudes. A payload is suspended from an LTA platform and includes one or more of instruments (e.g., scientific instruments), crew compartments, control equipment (ballast systems, propulsion systems or the like) or communication equipment (for communication with other LTA platforms, ground stations, telecommunications, broadband access or the like).

In some examples, LTA platforms include one or more empennage, such as tails, tail fins, canards, stabilizers, or the like that extend from the envelope and provide passive counter moments to offset perturbations such as wind, updrafts, downdrafts, variations in drag along the surface of the envelope or the like that otherwise cause non-specified movement of the LTA platform including deviations from one or more of specified pitch, yaw or roll values. In LTA platforms the empennage can be bonded to the envelope along seams and can be inflated with the envelope of the LTA platform as the platform approaches a specified altitude (e.g., an initial or operating altitude).

SUMMARY

The present inventors have recognized, among other things, that a problem to be solved can include removing empennage, such as tails, fins, canards, stabilizers, or the like while at the same time addressing perturbations (e.g., winds, drag variations or the like) that cause escalating deviation of the LTA platform from specified values of pitch, yaw, or roll. Empennage typically provide counter movements to perturbations that affect the LTA platform (e.g., cause deviation from pitch, yaw or roll values). For instance, as air flows over the LTA platform envelope the LTA platform experiences a corresponding moment and rotates away from the wind (and presents a broadside to the oncoming wind). As the LTA platform rotates away from the wind, the additional surface area of the envelope is exposed to the oncoming wind and the rotation and associated deviation escalates. Empennage can mitigate this uncontrolled rotation by applying a counter moment to the moment caused by the perturbation. For example, the empennage experience the same wind (as the envelope) and as the platform begins to rotate the surface of the empennage under the wind load applies a counter moment to the rotation of the platform. The empennage and the associated counter moments minimize the divergence from specified pitch, yaw or roll values. One example of wind loading, and a counter moment provided by an empennage is shown in FIGS. 2A and 2B.

Empennage are not without disadvantages and can provide a potential number of complications for LTA platforms. The empennage are in communication with the envelope of the LTA platform, and in some examples also deploy as the envelope volume increases during ascent after launch. For instance, the envelope at launch is inflated with lift gas to one fiftieth to one eighth (0.020 to 0.120) of its total volume and then released. As the envelope rises, the atmosphere thins, and therefore the atmospheric pressure decreases, so that the lift gas expands, and the envelope volume accordingly increases to a full or near full volume. As the envelope inflates the envelope material is flaccid and subject to potentially significant dynamic movement including flagging, folding, rolling, whipping movement or the like from one or more of inflation or perturbations (e.g., wind, drag variations). The empennage are also subject to dynamic movement and in some examples, repeatedly strike or collide with the envelope. The contact between the empennage and the envelope may damage either or both of the envelope or empennage and can cause damage that can include tearing, causing leaks, trapping the empennage and envelope to frustrate inflation, operations, use or the like of the envelope.

Additionally, because the empennage extends from the envelope a bond or seam is provided therebetween to prevent leaking. During ascent there is potential dynamic movement and inflation which can cause stresses in and to the envelope during operation at altitude. In these circumstances the structural connection between the empennage and the envelope may fail or partially fail, causing a leak. The gradual (or rapid) loss of lift gas decreases the operating life of the LTA platform or, in some examples, precipitates aborting the launch of the LTA platform. A potential solution includes providing a heavier duty, and more durable bond or seam to minimize leaking. However, the heavier duty bond or seam provides additional mass to the LTA platform and accordingly requires the sacrifice of mass elsewhere, for instance in the payload. In other examples, high pressure inflation (relative to pressures for inflating a pumpkin balloon or unfinned aerostat) is conducted to ensure the empennage properly deploy when inflated (e.g., without wrinkling or binding or the like). The higher-pressure inflation precipitates the use of heavier duty materials for the LTA platform envelope to minimize leaking, splits or the like. The heavy-duty materials add additional mass to the LTA platform that further minimizes the available payload.

Further, empennage provide additional mass to the LTA platform. The seams that interconnect the empennage with the envelope increase the mass of the LTA platform. Additionally, the empennage themselves include the envelope material or another material that adds additional mass to the LTA platform. In some examples three or more empennage are included with an LTA platform and thereby triple (or more) the mass of an empennage. Further still, empennage positioned proximate to the aft (or fore) of the envelope change the center of gravity of the LTA platform and may cause pitching of the platform if not counterbalanced. The counterbalancing of the LTA platform (e.g., with counterweights) adds additional mass to the LTA platform.

The increased mass of the LTA platform (whether from empennage, counterweights, heavier duty materials, or both) decreases the quantity of payload (mass) that may be carried by the LTA platform. Accordingly, the absence of empennage, their associated mass, deployment and potential issues with leaking and damage to the LTA platform is beneficial. However, the absence of empennage in some examples frustrates control of the LTA platform when subject to perturbations as discussed herein. The present system can help provide a solution to this problem, such as with an active stability control system that operates distributed propulsion elements to counteract deviations caused by perturbations while at the same time facilitating the absence of empennage from the LTA platform.

The present inventors have found solutions to these problems with a lighter than air platform including an unfinned envelope and a navigation controller that can be or include a navigation module and configured to provide refined navigation instructions that account for perturbations (e.g., deviations) and base navigation instructions. The system includes a navigation sensor configured to monitor an actual flight path of the LTA platform including an unfinned envelope. The system further includes at least one perturbation sensor configured to monitor one or more perturbations of the unfinned envelope including, but not limited to attitude perturbations (e.g., positional deviations such as rotation in yaw, pitch or roll) and instability perturbations such as position deviations as a function of time (e.g., rates of change of the deviations that are of a shorter term than position deviations and are optionally more difficult to detect and compensate).

The navigation controller is configured to guide the LTA platform including the unfinned envelope with coordinated propulsion between two or more propulsion elements (e.g., propellers, fans, engines or the like) to facilitate orientation and travel of the unfinned envelope. The navigation controller includes a navigation comparator that compares the actual flight path with a specified flight path, such as a specified over the ground track for the unfinned envelope. A navigation instruction (e.g., a base or initial instruction) is determined from the comparison.

A perturbation comparator, including but not limited to one or more comparators, compares the navigation instruction with one or more perturbations monitored with the at least one perturbation sensor (e.g., air data sensor, inertial sensor such as a gyroscope or heading sensor). A perturbation compensation is determined with the comparison and included with the navigation instruction to provide a refined navigation instruction for implementation with the propulsion elements. Optionally, the perturbation compensation includes both attitude and instability perturbation compensations to counteract detected positional changes (e.g., rotation such as yaw, pitch, or roll) as well as short term, and usually more difficult to detect, positional changes as a function of time such as changes in yaw, pitch or roll per unit time. Perturbations, both positional and position as function of time, have escalating effect on an unfinned envelope since an unfinned envelope does not include a passive counter moment such as a empennage. Accordingly, inclusion of the active perturbation compensation with the navigation instruction facilitates rapid counteracting of perturbations, for instance with active counter moments that are included with navigational control. In one example, the navigation instructions and the one or more associated perturbation compensations are converted to unitless quantities such as unit-based quantities such as degrees, degrees per second or the like, to facilitate comparison and generation of the refined navigation instruction for delivery that includes both components including perturbation compensation.

The navigation controller can include a propulsion coordinator in communication with the two or more propulsion elements. The propulsion coordinator can receive the refined navigation instruction including the navigation instruction and the perturbation compensation and controls propulsion values at each of the two or more propulsion elements to implement the refined navigation instruction. For instance, a refined navigation instruction can include a base navigation instruction and one or more perturbation compensation can be transformed into component propulsion values such as rpms, engine power or the like, for each of the respective propulsion elements. The propulsion values, when implemented by the propulsion elements, conduct the navigation operation while at the same time addressing perturbations. In some examples, addressing perturbations includes counteracting deleterious effects on the base navigation instruction that can include turning away from a specified flight path, instability such as rocking of the platform or the like. In other examples, addressing perturbations includes leveraging the effect of positive perturbations on the base navigation instruction, for instance if the perturbation is helpful toward turning the LTA platform in a direction coinciding with the specified flight path.

This overview is intended to provide an overview of subject matter of the present patent application. It is not intended to provide an exclusive or exhaustive explanation of the invention. The detailed description is included to provide further information about the present patent application. Further, wherever a singular expression is used, that expression is considered as including the plural.

BRIEF DESCRIPTION OF THE DRAWINGS

In the drawings, which are not necessarily drawn to scale and where like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
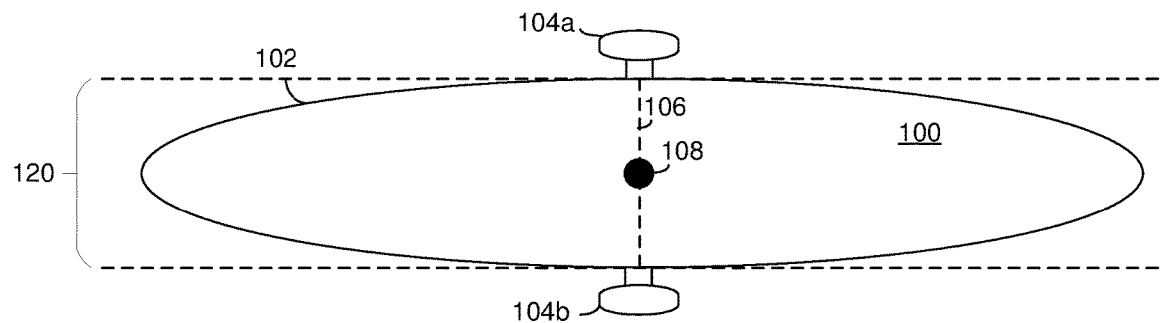
FIG. 1A is a top view of one example of an envelope and lighter than air (LTA) platform having an unfinned envelope.

Referring to FIG. 1A, one embodiment can include a lighter than air platform 100 having an unfinned envelope 102 configured for lighter than air operation. The envelope can be devoid of empennage, including devoid of a tail, canard, fin, vane, stabilizer and the like. Two or more propulsion elements 104a to 104b can be coupled with the unfinned envelope wherein each of the two or more propulsion elements can be configured to provide independent propulsion to the unfinned envelope. A first propulsion element can provide a thrust vector that is parallel or not parallel to the second force vector. A first propulsion element can provide a higher thrust than a second propulsion element. In one embodiment a first propulsion element 104a is disposed on the first side of the envelope and a second propulsion element 104b is disposed on an opposite side of the envelope so that there are two propulsion elements carried by the envelope. In one embodiment, a propulsion element can include two or more thrust generators (e.g., propellers) so that a propulsion unit can include more than one thrust generator. The propulsion element can be coupled on one side of the envelope and can operate in conjunction with each other. The propulsion elements can rotate up and down or in other directions in cooperation or independently. The propulsion elements can be positions at or near a short axis 106 that intersects a center of gravity 108 of the envelope. In one embodiment, the propulsion elements can be proximate to the center of gravity and be carried by larger moment arms in comparison to when they are placed aft or forward so that they can minimize the moment arm. The moment arm can be the perpendicular distance between the line of action of the force and the center of moments and can be expressed by the following formula:

$$\mu_n = r'' Q$$

where $\mu_n$ is the moment, $r''$ is the distance to some point and Q is the physical quantity such as a force applied at a point, or a point charge, or a point mass, etc. The moment is the measure of its tendency to cause a body to rotate about a specific point or axis. When the propulsion elements are positioned at or near the midpoint of the envelope, they can result in a larger rotation about the center of gravity than when placed aft or forward.

Figure 1B:
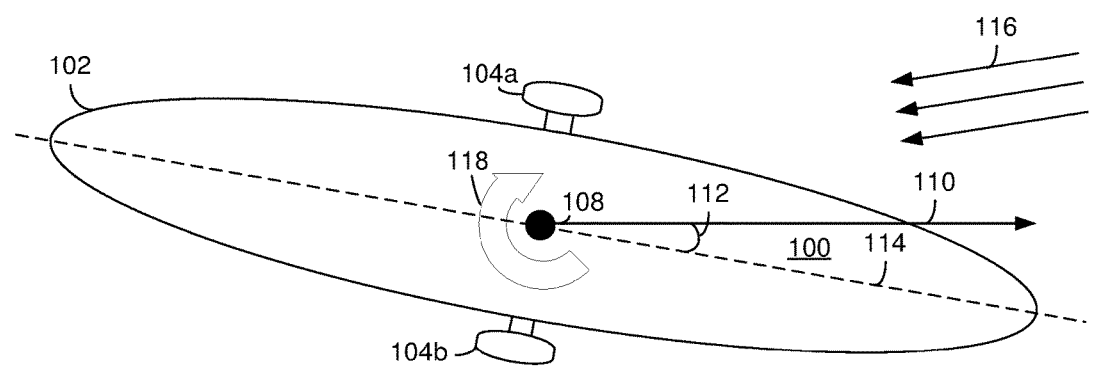
FIG. 1B is a top view of one example of a LTA platform having an unfinned envelope.

Referring to FIG. 1B, by way of example, the envelope can be traveling along a desired flight path 110 and due to perturbations, be diverted at an angle 112 to the flight path 110 wherein angle 112 is defined between the desired flight path 110 and the long axis of the envelope 114. In this case, the propulsion elements 104c and 104d can provide thrust that is greater than that of propulsion elements 104a and 104b so that the moment diverting the envelope can be overcome and angle 112 caused to become small returning the envelope at or near the designed flight path. It shod be noted that the thrust of propulsion elements 104c and 104d can be dependent upon angle 112 as the angle increases in size, the force causing the perturbations can increase. For example, cross wind, updraft, down draft, drag variation or the like, which can be referred to as perturbation forces are shown as 116 and can be exerted on the envelope. In some cases, such as yaw, the effect of the force on the envelope can increase due to more surface area of the envelope being impacted. This force can impact the envelope and cause movement to the envelope causing perturbation deviations of position, rotation, and both, each of which can also be a function of time. As the vehicle deviates from the desired vector, in one example, the propulsion elements and the resulting moment can be controlled and apportioned based on the envelope deviation (e.g., size of angle 112, rate of change of the angle, acceleration of the change in the angle and the like). This can be referred to as the perturbation deviation. The perturbation deviation can include a roll, pitch or yaw which can be caused by forces on the envelope. The perturbation deviation 118 or perturbation moment results from these forces.

The propulsion elements can be active counter moment generated from a delivered navigation instruction that includes a base navigation instruction and one or more compensating values that actively counteract perturbation deviations (e.g., position, rotational deviations and the same as functions of lime) including deviations in yaw, pitch or the like. A counter moment 120a can be created by the propulsion elements causing the envelope to travel along a path opposite that of perturbation deviation 118 to therefore offset the perturbation deviation and return the envelope to the desired flight path.

Figure 2A:
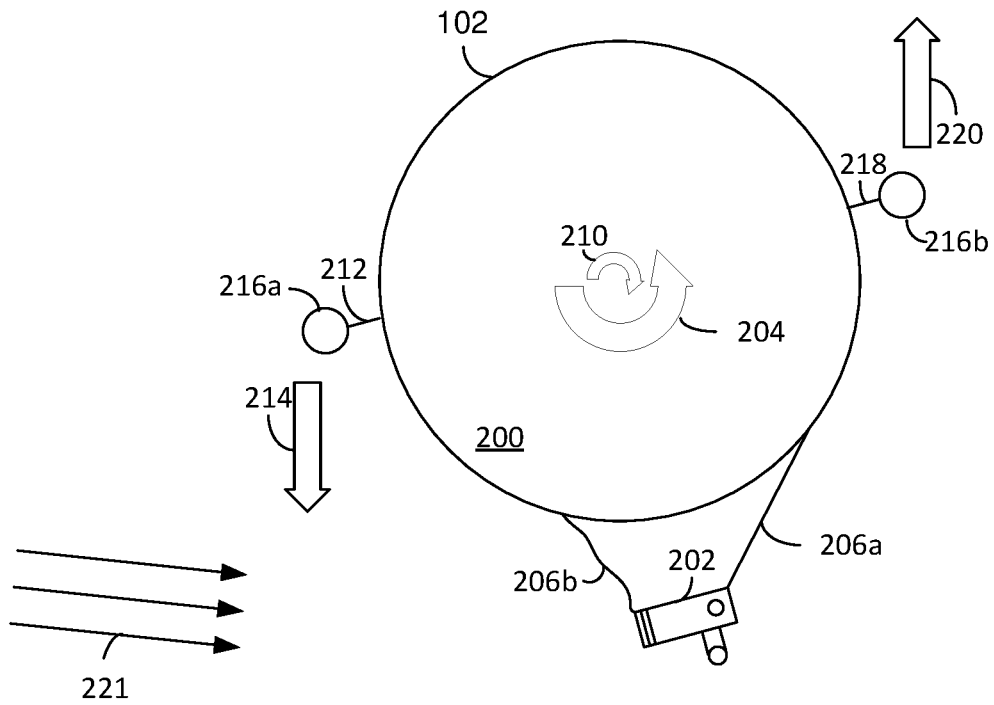
FIG. 2A is a schematic front view of an LTA platform with a payload.
Figure 2B:
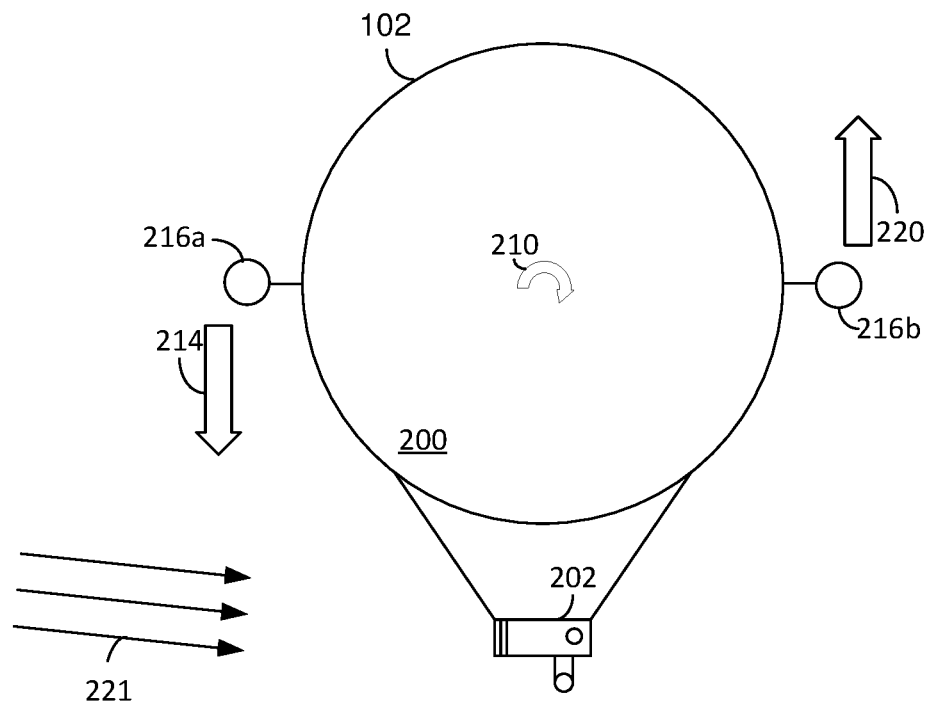
FIG. 2B is a schematic front view of the LTA platform with a payload.

Referring to FIG. 2A, the front of the envelope is shown carrying a payload 202 attached to the envelope 200. Forces 201 can cause the envelope to have a perturbation deviation 204 shown a roll in the envelope. This type of perturbation deviation can cause the payload to rise based upon lateral support 206a being higher than desired which can cause lateral support 206b to slack resulting in the payload being carried in an undesired position. When this perturbation deviation occurs, the propulsion elements can be oriented at an angle relative to the longitudinal vehicle axis (e.g., up, or down; down as shown in this example) to provide the active counter force 210 and corresponding active counter moment. In one embodiment, the propulsion elements can rotate about propulsion elements axis 212 so that the propulsion elements can provide a counter perturbation force in a direction shown as 214. In one embodiment, a second propulsion element 216b can rotate about a second propulsion elements axis 218 and provide a counter perturbation force in a direction shown as 220. The total counter perturbation force can include a first counter perturbation force 214 that is provided by a first propulsion element 216a and a second counter perturbation force 220 that is provided by a second propulsion element 216b. The first counter perturbation force can be greater than, equal to or less than the second counter perturbation force. The first counter perturbation force and the second counter perturbation force can both have a parallel vector such as 0° separation, opposite vectors such as 180° apart or any angle therein. When the counter perturbation force has offset the perturbation deviation, the envelope can return to the desired orientation as shown in FIG. 2B. The counter perturbation force can remain in effect to prevent any perturbation deviation from the forces until the forces subside.

In one embodiment, the propulsion elements are outside or exterior to the transverse fuselage profile 120 (FIG. 1A). Therefore, the propulsion elements can have a greater moment arm when compared to aft mounted propulsion elements. When the propulsion elements are outside or exterior to the transverse fuselage profile, they can provide a larger counter moment to counteract perturbation deviations as well as instability. Further, when outside the exterior to the transverse fuselage profile, the propulsion elements can increase the respective moment arms for the applied force and corresponding active counter moment when compared to a propulsion element within the transverse fuselage profile.

Figure 3A:
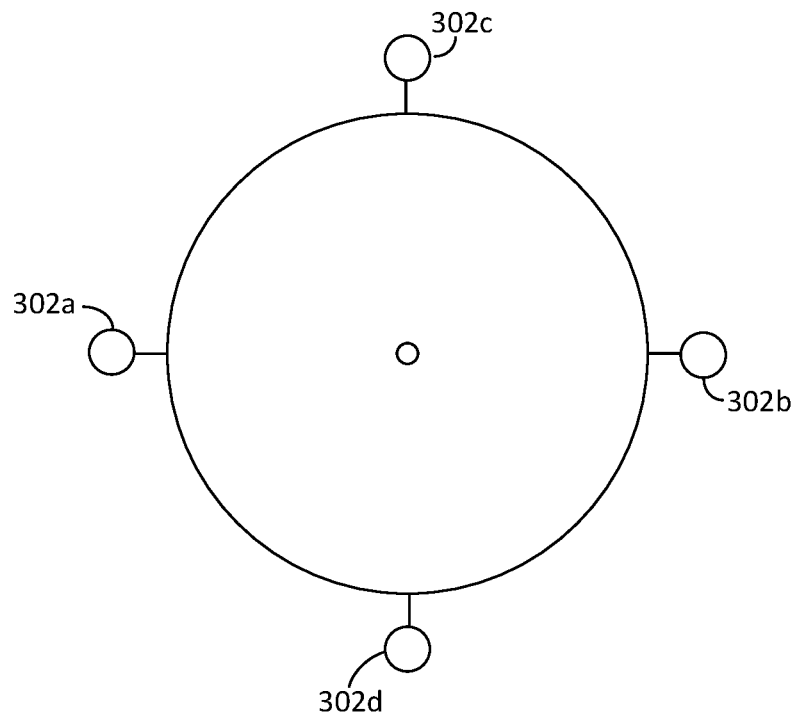
FIG. 3A is a front view of one example of an LTA platform with a first configuration of propulsion elements.
Figure 3B:
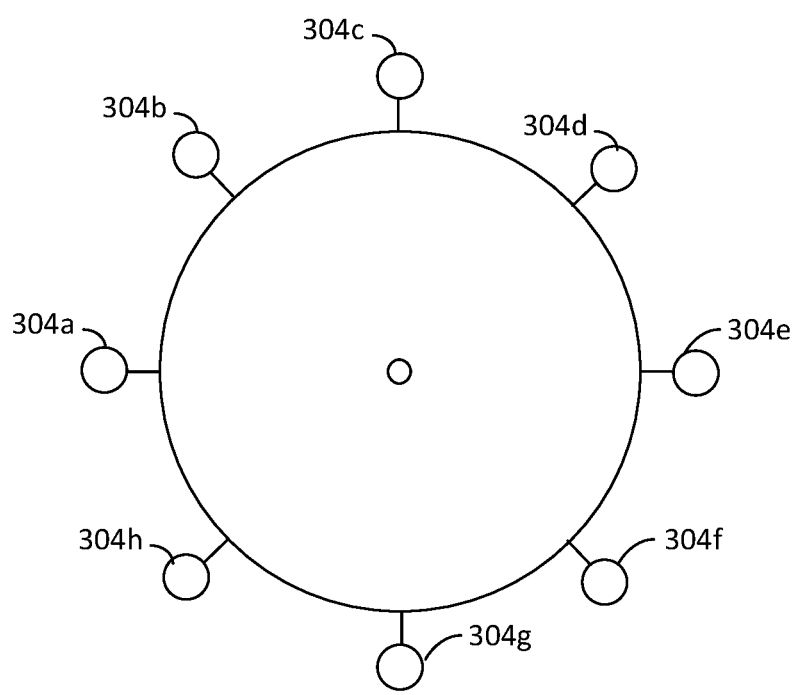
FIG. 3B is a front view of one example of an LTA platform with a second configuration of propulsion elements.

Referring to FIGS. 3A and 3B, various propulsion element arrangements as shown. In one embodiment, the trust or force, including counter perturbation force, generated by one or more propulsion elements can be apportioned between the propulsion elements. In one embodiment, this is accomplished with variations in revolutions per minute if the propulsion element includes a propeller and can be actuated according to navigation instructions. Each propulsion element can include one or more thrust generators. The thrust generators can provide trust in the same vector or can rotate relative to each other and provide thrust in different vectors. In one embodiment the propulsion elements can be disposed around the perimeter of the envelope as shown with propulsion elements 304*a* through 304*h*.

Figure 4:
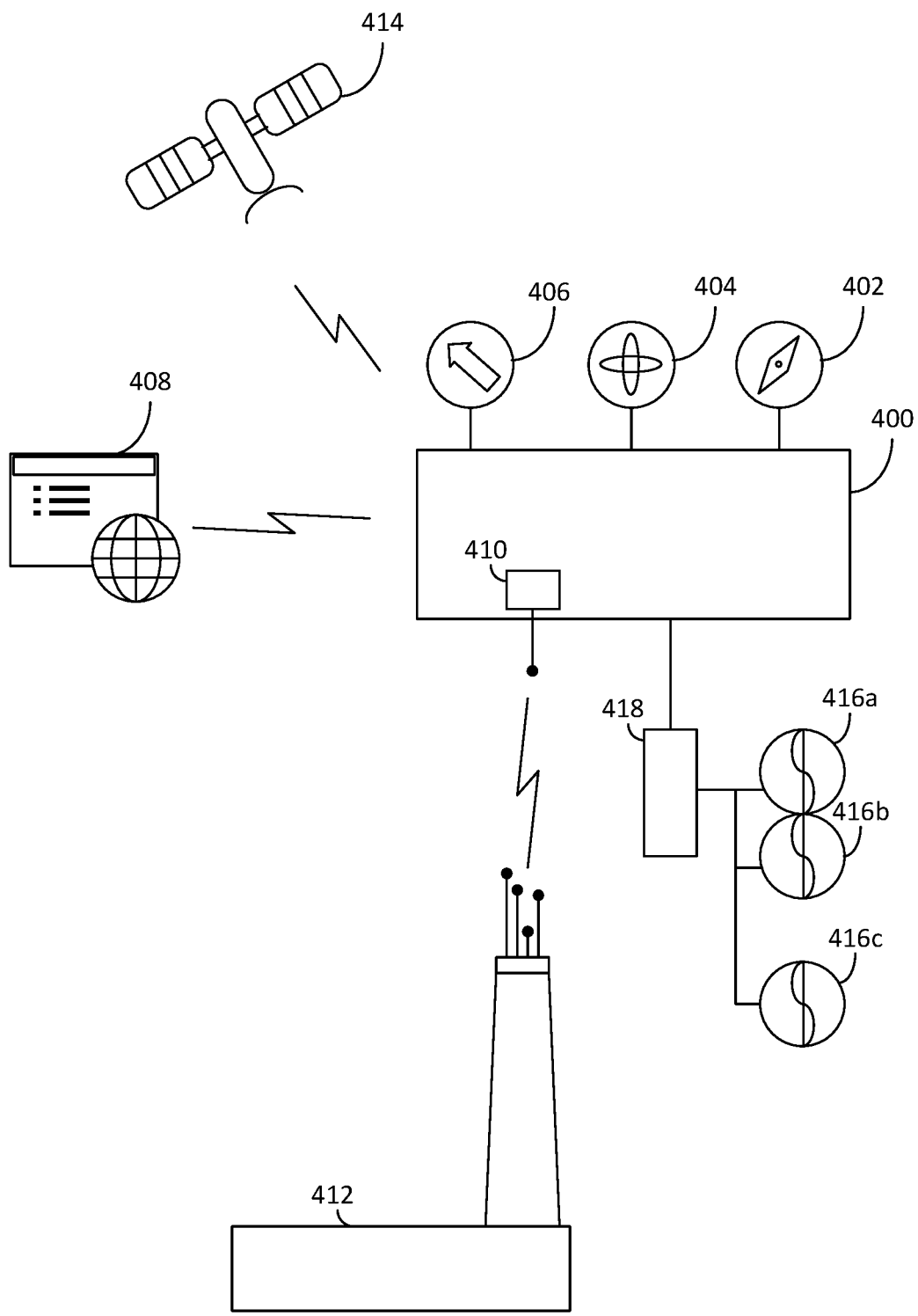
FIG. 4 is a schematic view of aspects of the system and communications between various components.

Referring to FIG. 4, the navigation controller 400 is shown. The navigation controller can include a computer readable medium that can receive, store and process computer readable instructions. The computer readable instructions can perform the functions and operations that are described herein. The navigation controller can be in communication with a perturbation assembly that can include various perturbation sensors such as a heading sensor 402. In one embodiment, the heading sensor can be or include a gyroscope, magnetic compass, flux gate, and the like. The heading of the envelope can be determined, and perturbation deviation can be detected and communicated to the navigation controller. The navigation controller can be in communication with an internal sensor 404 such as altitude, orientation, accelerometer, GPS and the like. The internal sensor can detect a perturbation deviation and communicate the perturbation deviation to the navigation controller. An air sensor 406 can be in communication with the navigation controller and can determine a perturbation deviation such as slide slip angle or angle of attack or pitch angle. The air sensor can also determine an angle of the prevailing wind relative to the envelope axis. The air sensor can be configured to measure air data including air vectors such as speed, direction, rate of change and the like.

The navigation controller and perturbation assembly can be in communication with third party systems 408 such as a national weather service, inline services and the like. The navigation controller can receive information from these third-party systems and services that can include temperature. pressure, wind direction and speed or the like. This information can be received by the navigation controller or other envelope systems and can be incident perturbations. An incident perturbation can include a force on the envelope that originates from a source sue to an incident such as a storm, unexpected weather pattern and the like. A navigation sensor 410 can be in communication with ground tracking systems 412 and satellite system 414 that can provide location information, direction information, speed information and the like using a service and system such as a global navigation satellite system, positioning, navigation, and timing services, star tracker, radio frequency-based navigation aids including very high frequency omni-directional range, distance measuring equipment, tactical air navigation system and the like. The navigation controller can also receive information representing target location including waypoints and destination target locations, specified time for arrival and the like.

The navigation controller can be in communications with one or more propulsion elements 416*a* through 416*c* and can provide operational instructions to the propulsion elements actuating the propulsion elements for thrust, orientation and force vector. The propulsion elements can be in communication with a propulsion elements controller 418 which can be in communication with the navigation controller, in one embodiment.

A propulsion element and a propulsion elements controller can receive operation instructions from the navigation controller that correspond to apportionment of an overall vehicle moment and force to guide the envelope based on inputs including the deviation sensors, one or more of a specified flight path, ongoing perturbations, instability perturbations and the like. The navigation computer readable instructions can transmit information to the propulsion elements and propulsion elements controller for correcting instability such as yaw, pitch and roll, that can be caused by dynamic and even rapidly changing and ongoing perturbations, such as turbulence, winds, or the like. navigation computer readable instructions can transmit information to the propulsion elements and propulsion elements controller for correcting for prevailing winds that can be associated ongoing perturbations. The navigation computer readable instructions can transmit information to the propulsion elements and propulsion elements controller for providing counter forces to combat the prevailing wind so that they can be overcome to prevent shifting and deviations from the flight path. The navigation computer readable instructions can transmit information to the propulsion elements and propulsion elements controller for counter acting prevailing winds along the slide slip angle, defined as the angle between body axis and the wind, that causes shifting and deviations from the flight path. The navigation computer readable instructions can transmit information to the propulsion elements and propulsion elements controller for turning the long body axis of the envelope into the wind in a manner that compensates for the y component of the prevailing wind that otherwise may cause shifting. The navigation computer readable instructions can transmit information to the propulsion elements and propulsion elements controller for rotating the envelope long axis to an angle relative to the flight path to maintain the course (ground track) of the envelope along the flight path. The navigation computer readable instructions can transmit information to the propulsion elements and propulsion elements controller for correcting for a change in flight path to a new flight path (ground track to a new ground track) that can include a rate of change, such as degrees per second and change, such as degrees, to a new flight path or maintenance of a current flight path (ground track).

The navigation computer readable instructions can an actual flight path with a specified flight path and determine if a course correction is needed. The navigation computer readable instructions can compare the navigation instruction with one or more perturbations (e.g., ongoing, dynamic forces acting on the envelope) to determine a perturbation compensation and transmit that information to the propulsion elements and propulsion elements controller. The navigation computer readable instructions can determine propulsion values for the propulsion elements to implement the navigation instruction and perturbation compensation and transmit that information to the propulsion elements and propulsion elements controller. The navigation computer readable instructions and propulsion elements controller can determine an actuation information to send to the propulsion elements so that the propulsion elements can provide thrust according to the navigation instructions and the perturbation compensation needed. The navigation computer readable instructions and propulsion elements controller can apportion the force and trust generated by each propulsion element so that the net results is to provide desired movement and motion to the envelope according to the navigation instructions and the perturbation compensation.

Figure 5:
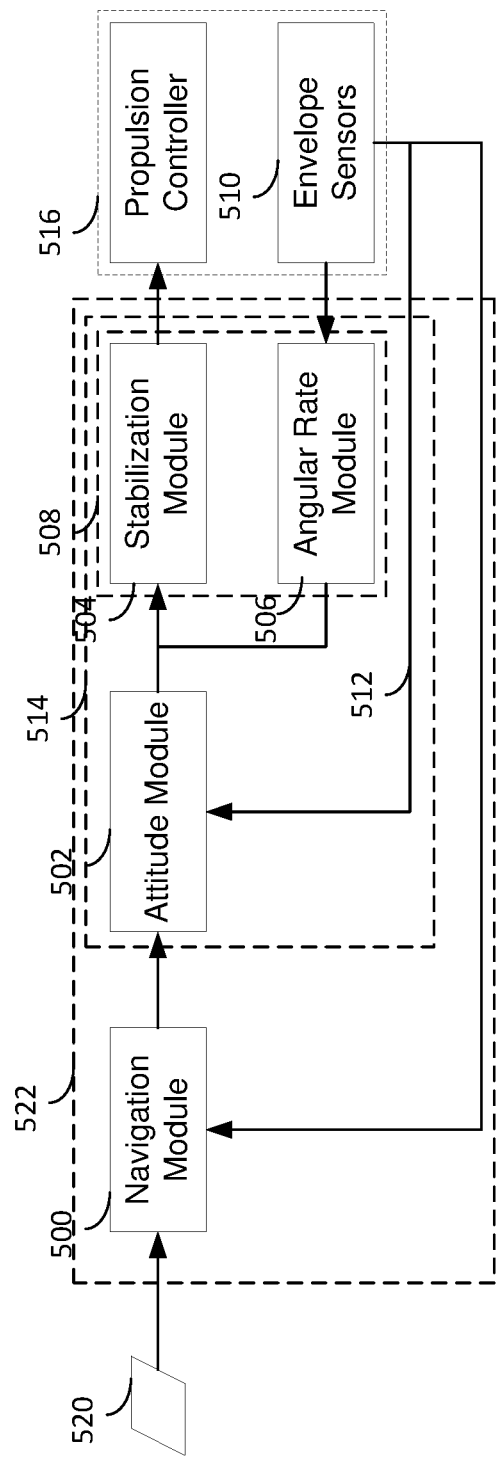
FIG. 5 is a schematic view of one example of communications, data flow and information transmission between the various controllers, module and components.

Referring to FIG. 5, the navigation controller computer readable instructions can be understood to those skilled in the art as modules. A module can be one or more hardware devices, and computer readable instructions or any combination. The hardware can be special purpose hardware designed for high altitude operations as the envelope can operate at a height of six miles above sea level and higher. In one embodiment the navigation computer and the propulsion elements controller are special purpose computer devices configured for operation at high altitudes. General computer systems can have failures, including hardware failures, at low at 10,000 feet (1.89 miles and 3.05 km). Therefore, the navigation computer and the propulsion elements controller can be adapted to comply with vibration standard MIL-STD-810G, Method 514.6, Procedure I and MIL-STD-810G, Method 500.5, Procedure II. In one embodiment, the envelope can operate at nine- and one-half miles or higher above sea level. In one embodiment, the envelope is a light than air structure. In one embodiment, the envelope can operate at, in, or above the stratosphere.

The navigation controller can include a navigation module 500 that is adapted to and includes computer readable instructions to receive a navigation deviation and generate a correction. The correction can be a determination of the change in a yaw value, a pitch value, a roll value and any combination, for example. The correction can include instructions that can be transmitted to attitude module 502 and stabilization control 504. The altitude module can provide a set of navigation instructions or modify existing navigation instructions based upon the attitude information received. The altitude module can decide that an attitude deviation is occurring, and the system can provide perturbation compensation information that can be used by the propulsion elements to modify the flight and operation of the envelope. The navigation instructions can be unitless (e.g., ratio, Δx where x can represent a change in two values having the same unit) and may also be multicomponent to represent values for various axes (e.g., yaw, pitch, roll).

The stabilization module 504 can generate a navigation instruction for implementation by the propulsion elements. The provided navigation instructions can be generated according to an initial navigation instruction that can be modified by the attitude module according to an attitude deviation that can be received from the attitude module and a stability deviation determined by the stabilization module. Therefore, an ongoing and dynamic perturbation compensation can be determined and provided to the propulsion elements. For example, a sustained cross-wind could result in the need for a ongoing perturbation compensation for so long as the cross wind exists.

The perturbation compensation can be made according to the deviation and corresponding correction which can be used to generate a navigation instruction. The navigation instruction can include one or more values, such as yaw, pitch, roll moment and the like, that will be translated into apportioned thrust between the propulsion elements to apply the moment and decrease the deviation toward zero. In an example, the output navigation computer readable instructions can be dimensionless and can be translated to actual moment and torque to direct the envelope. This ability allows the envelope to be included in an unmanned air vehicle so that navigation and corrections can occur autonomously. The navigation module can receive attitude deviation information, perturbations, and other undesirable moments and movement and determine perturbations compensation information. The correction information can be determined according to the corresponding effect of perturbations caused by exterior forces that affect the navigation instruction of the envelope in an ongoing manner.

The navigation module can include or be in communication with an angulate rate module 506 which can determine the rate at which the envelope rotates, or revolves, about an axis extending through the envelope as well as about the center of gravity. Information from sensors 510 associated with the envelope performance and operation can be received in to the angular rate module. The angular rate can also be the change in the angular velocity. The angular rate module can determine a change in orientation of the envelope as a function of time caused by a perturbation such as a rate of change that can be measured in degrees per second. Information can be received from eh envelope sensors 510 in an inner feedback loop 508 along information path 512. The angular rate module can determine if the change in orientation is being amplified by rotational inertia wherein the change in inertia can be greater with a greater change in rate. The angular rate module can determine a change in orientation, angle, degrees, and any combination per unit time instead of degrees as well. A high rate or change can indicate high instability. This can be in contrast to longer deviations such ash attitude perturbations and can be measured in degrees. The chance in orientation can be provided by gyroscopes, including solid state and microelectromechanical systems, fiber optic gyroscopes, laser rings, spinning wheel and the like. Units can be in degrees per second for one or more of yaw (z) axis, pitch (y) axis, roll (x) axis and any combination that can depend on which axes is being monitored. The change in orientation can be converted into a unitless value for comparison with the navigation instructions and modified navigation instructions. The stability deviation or dynamic perturbation compensation can limit and there minimize the excessive changes caused by perturbations.

The system can be adapted to and include computer readable instructions to determine a stability deviation and dynamic perturbation compensation value. This value can correspond to the effect of instability of the envelope, and associated lighter than air platform that can affects the navigation instructions. The stability deviation(s) can result in a rapidly escalating effects of instability perturbations on a finless envelope. This compensation can account for the effects of rotational inertia (in one or more axes) through an inner feedback control loop 508. The inner feedback loop can de the flow of information between the stabilization module and the angular rate module resulting in an ongoing creation and transmission of navigation instructions and information to propulsion elements according to the inner feedback control loop. By comparison of the information received from the angular rate module and the attitude module, information for stabilization of the envelope can be provided to improve the performance of envelope and light then air platform 516.

The system can include an intermediate feedback loop 514 that is defined by information flowing from the envelope sensors, angular rate module and received by the attitude module for transmission of navigation instructions to the stabilization module. The attitude deviation or ongoing perturbation compensation value corresponding to the effect of perturbations caused by exterior forces (e.g., yaw, pitch, roll) that affect the navigation instruction of the envelope and associated lighter than air platform can occur in an ongoing manner, resulting in the intermediate feedback loop. The intermediate feedback loop can provide modified navigation instructions accordingly so that the propulsion elements are operating according to the perturbations of the envelope and provide counter forces to correct deviation from the flight path.

The envelope and sensors, propulsion unit and other hardware and software can receive air data including air speed, temperature, pressure, altitude and the like and in any combination. The propulsion controller can receive navigation instructions that case the propulsion controller to actuate propulsion elements to provide counter forces to perturbation thereby providing perturbation compensation. The forces associated with perturbation compensation can be apportioned between various propulsion elements through modification or actuation of revolutions per minute, torque to a propeller, and the like. These forces can guide the envelope along a specified flight path which also counteracts the deviations that could result from perturbations, instability and the like. The system allows for the propulsion controller to actuate propulsion elements according to the navigation instructions and perturbation compensation requirements.

Attitude perturbations can be measurable deviations (angle) between the long axis of the hull relative to the prevailing wind and air stream. These perturbations can be caused by wind, up and down drafts, turbulence and the like and can be associated with instability of the envelope. The instability can escalate because of the finless envelope. The system can determine attitude variations (degrees) in yaw, pitch or roll from what is desired, planned, specified or predicted (e.g., heading relative to air stream). The system can determine and contrast these perturbations from rapid deviation for long a term to small deviation over a short term measurable as rotation as a unit of time (in the inner loop) caused by perturbations that cause instability. Initial units can be in degrees (e.g., yaw (z) axis, pitch (y) axis, roll (x) axis) and can be converted to a unitless value for comparison with the navigation instructions. For instance, the degree perturbation measurement(s) is equated to a value that is then compared with the value of the navigation instructions. When actual perturbations and the resulting attitude deviation are detected, the system may initiate turning of the nose or long axis of the envelope in a direction that is offset from a specified flight path 520 or trajectory that is initially desired and provided to the navigation module pre of during flight.

The envelope and sensors can provide monitoring and information about the actual flight path which can be provided to the navigation module. For example, global positioning satellites can provide the position of the envelope which can be provided to the navigation module. The system can receive information from a positioning, navigation, and timing service can provide comparing the actual position of the envelope, such as the track over the ground, with the desired flight path and a comparison can be made. If the actual flight path deviates from the desired flight path, the navigation module can modify the navigation instructions that can be transmitted to the propulsion controller. The specified track of the envelope over the ground can be represented from 0° to 360° and can be distinct from the heading of the envelope. The heading is the direction that the envelope is traveling which the ground track is the desired destination. In the event of wind, the heading and track can be different. The navigation module can determine the ground track and compare it to the heading and adjust the heading by modification of the navigation instructions accordingly.

The navigation module can determine a navigation deviation. This deviation represents the actual monitored flight path (ground track) relative to the specified flight path (course). This comparison can determine the deviation between the actual ground track and the desired course. Units can correspond with the flight path (e.g., in degrees). In other examples is a multicomponent deviation including yaw, pitch and roll values can be included in the navigation instructions or proposed modifications. The navigation system receiving information from the sensors results in an outer feedback loop 522.

The hardware and software in this system can be used to compare actual information with desired information. The hardware and computer readable instructions can configured to provide for a navigation comparator, attitude comparator, instability comparator, and any combination. The various compensators can be implemented on a special purpose computer configured for operation at high altitudes, a computer placed in an environment allowing the computer to operate at high altitudes and can include computer readable instructions to provide the processes that are designed herein. The initial navigation instructions can be modified and refined one or more times and sent for actuation to the propulsor controller one or more times. The navigation instructions can be refined through information provided from the inner, intermediate, and outer feedback loops.

The propulsion controller can receive navigation instructions that can include be ne along with perturbation compensation. The navigation instructions can be a refined version of the original or initial navigation instruction that are modified according to perturbation compensation. Optionally a unitless value (or values if multiple axes) can be converted to a moment(s) by multiplying the value(s) by a function of speed, altitude or the like, for instance with multiplication of the value by a dynamic pressure (function of speed and altitude) and reference area; the units of the resultant are a force x distance (e.g., a torque, or propulsive moment) with the distance between the propulsion elements and the center of gravity or other propulsion elements a desired thrust is calculated for each element and corresponds with a motor speed or engine torque or provided thrust. The applied forces and thrusts, according to propulsive moment or moments if in multiple axes, is an implementation of the desired navigation while accounting for attitude and stability deviations. The propulsion controller actuate these instructions and guides the envelope and associated light than air platform.

The system can include at least one navigation sensor configured to monitor an actual flight path of the unfinned envelope. The system can include at least one perturbation sensor configured to monitor one or more perturbations of the unfinned envelope. The navigation controller can be configured to provide navigation instructions to a propulsion controller or propulsion element to guide the unfinned envelope and to coordinated propulsion of the propulsion elements. The navigation controller can include a navigation comparator configured to compare the actual flight path with a specified flight path of the unfinned envelope in a navigation comparison and determine a navigation instruction for the unfinned envelope based on the navigation comparison, a perturbation comparator configured to compare the navigation instruction with the monitored one or more perturbations in a perturbation comparison and determine a perturbation compensation based on the perturbation comparison, and a propulsion coordinator in communication with the two or more propulsion elements, the propulsion coordinator configured to control propulsion values of each of the propulsion elements based on the navigation instruction and the perturbation compensation.

The perturbation comparator can be configured to determine one or more deviations of the unfinned envelope relative to the navigation instruction caused by the one or more perturbations. The one or more deviations detected can includes escalating deviations based on an unfinned profile of the unfinned envelope. At least one perturbation sensor can be configured to monitor one or more perturbations including deviations in position, rotational position, position as a function of time, or rotation as a function of time. The one or more perturbations can include at least one of yaw, pitch, roll perturbations and any combination and one perturbation sensor can be configured to monitor at least one of the yaw, pitch or roll perturbations or yaw, pitch or roll perturbations as a function of time. One perturbation sensor can include one or more of an air data sensor, inertial sensor, fiber optic gyroscope, ring laser gyroscope or spinning wheel gyroscope.

The system can include a navigation sensor that can use a global navigation satellite system sensor; a position, navigation and position, navigation and time sensor; radio frequency-based navigation aids; celestial navigation sensors and any combination.

The actual flight path can include the track over ground of the unfinned envelope, and a navigation sensor cam be configured to monitor the track over ground. The navigation instruction can include a unitless value that can correspond to a navigation deviation of the actual flight path relative to the specified flight path. The perturbation compensation can use a unitless value corresponding to a perturbation deviation of the navigation instruction based on the monitored one or more perturbations. The propulsion coordinator, which can be hardware or computer readable instructions or both, can include a force and moment element configured to convert the navigation instruction and the perturbation compensation to a combination of applied force and applied moment. The apportionment element can be configured to apportion the applied force and the applied moment into the propulsion values of each of the propulsion elements. Two or more propulsion elements can be remote relative to fore and aft portions of the unfinned envelope. The unfinned envelope can include a transverse envelope profile, and the propulsion elements can be positioned exterior to the transverse envelope profile.

A lighter than air platform can be provided that includes an unfinned envelope configured for lighter than air operation. In one embodiment, two or more propulsion elements can be coupled with the unfinned envelope wherein each of the two or more propulsion elements can be configured to provide independent propulsion to the unfinned envelope. A perturbation sensor can be configured to monitor one or more perturbations of the unfinned envelope and the navigation controller can be configured to guide the unfinned envelope with coordinated propulsion of the two or more propulsion elements. The navigation controller can include a perturbation comparator configured to compare a navigation instruction with the monitored one or more perturbations in a perturbation comparison and determine a perturbation compensation based on the perturbation comparison The navigation controller can include a propulsion coordinator in communication with the two or more propulsion elements, the propulsion coordinator configured to control propulsion values of each of the propulsion elements based on the navigation instruction and the perturbation compensation. The perturbation comparator can be configured to determine one or more deviations of the unfinned envelope relative to the navigation instruction caused by the one or more perturbations. The one or more deviations can include escalating deviations based on an unfinned profile of the unfinned envelope. The perturbation sensor can be configured to monitor one or more perturbations including deviations in position, rotational position, position as a function of time, or rotation as a function of time causing one or more of rotational or translational movement of the unfinned envelope; and the perturbation comparator can be configured to compare the navigation instruction with the one or more perturbations to determine the perturbation compensation. A perturbation sensor can be configured to monitor one or more perturbations including a perturbation causing one or more of rotation or rotation as a function of time of the unfinned envelope. The perturbation comparator can be configured to compare the navigation instruction with the one or more perturbations to determine the perturbation compensation. The one or more perturbations can include at least one of yaw, pitch or roll perturbations, and the perturbation sensor can be configured to monitor at least one of the yaw, pitch or roll perturbations or yaw, pitch or roll perturbations as a function of time. The perturbation sensor can be include one or more of an air data sensor, inertial sensor, fiber optic gyroscope, ring laser or spinning wheel gyroscope and any combination thereof.

The navigation instruction can include a unitless value that can correspond to a navigation deviation of an actual flight path relative to a specified flight path. The perturbation compensation can include a unitless value corresponding to a perturbation deviation of the navigation instruction based on the monitored one or more perturbations. The propulsion coordinator or controller can include a force and moment element configured to convert the navigation instruction and the perturbation compensation to a combination of applied force and applied moment and can include an apportionment element configured to apportion the applied force and the applied moment into the propulsion values of each of the propulsion elements. The two or more propulsion elements can be proximate to a center of gravity of the unfinned envelope. The unfinned envelope can include a transverse envelope profile, and the two or more propulsion elements are positioned exterior to the transverse envelope profile.

The system can be a method for controlling an unfinned lighter than air (LTA) platform that can include the method of or computer readable instructions for receiving an actual flight path of the unfinned LTA platform including an unfinned envelope, determining one or more perturbations incident on the unfinned envelope, generating a refined navigation instruction based on the actual flight path and the one or more perturbations for the unfinned LTA platform, generating includes: comparing an actual flight path of the unfinned LTA platform with a specified flight path to determine a navigation instruction, comparing the navigation instruction with the one or more perturbations to determine a perturbation compensation, and coordinating propulsion values between two or more propulsion elements based on the refined navigation instruction including the navigation instruction and the perturbation compensation.

The one or more perturbations can include one or more of a perturbation moment and a perturbation force incident to the unfinned envelope and the navigation system and method and propulsion module can include coordinating propulsion values based on the refined navigation instruction includes implementing a different propulsion value at each of the at least two or more propulsion elements to compensate for one or more of the perturbation moment or the perturbation force. The system and method can include comparing the navigation instruction with the one or more perturbations includes determining a perturbation deviation and the perturbation compensation is determined from the perturbation deviation. Generating the refined navigation instruction can include comparing the actual flight path with the specified flight path to determine the navigation instruction in a first feedback control loop and comparing the navigation instruction with the one or more perturbations to determine the perturbation compensation in at least a second feedback control loop nested within the first feedback control loop. The second feedback control loop can include an attitude perturbation control loop and an instability perturbation control loop and can include a system and method for comparing the navigation instruction with the one or more perturbations includes, comparing the navigation instruction with one or more attitude perturbations of the one or more perturbations to determine an attitude perturbation compensation of the perturbation compensation in the attitude perturbation control loop; and comparing the navigation instruction and attitude perturbation compensation with one or more instability perturbations of the one or more perturbations to determine an instability perturbation compensation of the perturbation compensation in the instability perturbation control loop. Coordinating propulsion values between the two or more propulsion elements based on the refined navigation instruction can include the navigation instruction and one or more of the attitude or instability perturbation compensations. The system and method can be adapted for directing the unfinned LTA platform with the refined navigation instruction having the navigation instruction and the perturbation compensation, wherein directing the unfinned LTA platform is conducted with the propulsion elements and the unfinned envelope. The system and method can be adapted for coordinating propulsion values between the two or more propulsion elements and include converting the navigation instruction and the perturbation compensation to an applied force and apportioning the applied force into the propulsion values of each of the propulsion elements to generate an applied moment.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "and" and "or" by context may mean "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium encoded with computer readable instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A lighter than air platform comprising:
    an unfinned envelope configured for lighter than air operation;
    two or more propulsion elements coupled with the unfinned envelope, each of the two or more propulsion elements are configured to provide independent propulsion to the unfinned envelope;
    at least one navigation sensor configured to monitor an actual flight path of the unfinned envelope;
    at least one perturbation sensor configured to monitor one or more perturbations of the unfinned envelope; and
    a navigation controller configured to guide the unfinned envelope with coordinated propulsion of the two or more propulsion elements, the navigation controller includes:
    a navigation comparator configured to compare the actual flight path with a specified flight path of the unfinned envelope in a navigation comparison and determine a navigation instruction for the unfinned envelope based on the navigation comparison; a perturbation comparator configured to compare the navigation instruction with the monitored one or more perturbations in a perturbation comparison and determine a perturbation compensation based on the perturbation comparison; and a propulsion coordinator in communication with the two or more propulsion elements, the propulsion coordinator configured to control propulsion values of each of the propulsion elements based on the navigation instruction and the perturbation compensation.

2. The lighter than air platform of claim 1, wherein the perturbation comparator is configured to determine one or more deviations of the unfinned envelope relative to the navigation instruction caused by the one or more perturbations.

3. The lighter than air platform of claim 2, wherein the one or more deviations includes escalating deviations based on an unfinned profile of the unfinned envelope.

4. The lighter than air platform of claim 1, wherein the at least one perturbation sensor is configured to monitor one or more perturbations including deviations in position, rotational position, position as a function of time, rotation as a function of time and any combination thereof.

5. The lighter than air platform of claim 1, wherein the one or more perturbations include at least one of yaw, pitch or roll perturbations, and the at least one perturbation sensor is configured to monitor at least one of the yaw, pitch or roll perturbations or yaw, pitch or roll perturbations as a function of time.

6. The lighter than air platform of claim 1, wherein the at least one perturbation sensor includes one or more of an air data sensor, inertial sensor, fiber optic gyroscope, ring laser gyroscope or spinning wheel gyroscope.

7. The lighter than air platform of claim 1, wherein at least one navigation sensor includes one or more of a global navigation satellite system sensor; a position, navigation and time sensor; radio frequency-based navigation aids; or celestial navigation sensors.

8. The lighter than air platform of claim 1, wherein the actual flight path includes a track over ground of the unfinned envelope, and the at least one navigation sensor is configured to monitor the track over ground.

9. The lighter than air platform of claim 1, wherein the navigation instruction is a unitless value corresponding to a navigation deviation of the actual flight path relative to the specified flight path.

10. The lighter than air platform of claim 1, wherein the perturbation compensation is a unitless value corresponding to a perturbation deviation of the navigation instruction based on the monitored one or more perturbations.

11. The lighter than air platform of claim 1, wherein the propulsion coordinator includes: a force and moment element configured to convert the navigation instruction and the perturbation compensation to a combination of applied force and applied moment; and an apportionment element configured to apportion the applied force and the applied moment into the propulsion values of each of the propulsion elements.

12. The lighter than air platform of claim 1, wherein the two or more propulsion elements are remote relative to fore and aft portions of the unfinned envelope.

13. The lighter than air platform of claim 1, wherein the unfinned envelope includes a transverse envelope profile, and the two or more propulsion elements are positioned exterior to the transverse envelope profile.

14. A lighter than air platform comprising:
an unfinned envelope configured for lighter than air operation;
two or more propulsion elements coupled with the unfinned envelope, each of the two or more propulsion elements are configured to provide independent propulsion to the unfinned envelope;
at least one perturbation sensor configured to monitor one or more perturbations of the unfinned envelope; and
a navigation controller configured to guide the unfinned envelope with coordinated propulsion of the two or more propulsion elements, the navigation controller includes:
a perturbation comparator configured to compare a navigation instruction with the monitored one or more perturbations in a perturbation comparison and determine a perturbation compensation based on the perturbation comparison; and
a propulsion coordinator in communication with the two or more propulsion elements, the propulsion coordinator configured to control propulsion values of each of the propulsion elements based on the navigation instruction and the perturbation compensation.

15. The lighter than air platform of claim 14, wherein the at least one perturbation sensor is configured to monitor one or more perturbations including deviations in position, rotational position, position as a function of time, or rotation as a function of time causing one or more of rotational or translational movement of the unfinned envelope; and the perturbation comparator is configured to compare the navigation instruction with the one or more perturbations to determine the perturbation compensation.

16. The lighter than air platform of claim 14, wherein the at least one perturbation sensor is configured to monitor one or more perturbations including a perturbation causing one or more of rotation or rotation as a function of time of the unfinned envelope; and the perturbation comparator is configured to compare the navigation instruction with the one or more perturbations to determine the perturbation compensation.

17. The lighter than air platform of claim 14, wherein the one or more perturbations include at least one of yaw, pitch or roll perturbations, and the at least one perturbation sensor is configured to monitor at least one of the yaw, pitch or roll perturbations or yaw, pitch or roll perturbations as a function of time.

18. The lighter than air platform of claim 14, wherein the propulsion coordinator includes:
a force and moment element configured to convert the navigation instruction and the perturbation compensation to a combination of applied force and applied moment; and
an apportionment element configured to apportion the applied force and the applied moment into the propulsion values of each of the propulsion elements.

19. The lighter than air platform of claim 14, wherein the two or more propulsion elements are proximate to a center of gravity of the unfinned envelope.

20. The lighter than air platform of claim 14, wherein the unfinned envelope includes a transverse envelope profile, and the two or more propulsion elements are positioned exterior to the transverse envelope profile.

21. A lighter than air platform comprising:
an unfinned envelope configured for lighter than air operation;
a first propulsion element carried by the unfinned envelope;

a second propulsion element carried by the unfinned envelope;

a perturbation sensor configured to monitor a perturbation of the unfinned envelope; and a propulsion controller in communication with the first propulsion element and he second propulsion element and configured to control propulsion values of each of the propulsion elements based on a navigation instruction received from a navigation controller, wherein the navigation controller is configured to guide the unfinned envelope with apportioned propulsion between the first propulsion element and the second propulsion element, wherein the navigation controller is adapted to compare a navigation instruction with the monitored perturbation, determine a perturbation compensation based on a perturbation comparison; and transmit the perturbation compensation to the propulsion controller.

* * * * *